(12) United States Patent
Ramon

(10) Patent No.: US 9,186,597 B2
(45) Date of Patent: Nov. 17, 2015

(54) EVAPORATION ASSEMBLY MODULE, ELEMENTS AND METHOD OF CONSTRUCTION THEREOF

(75) Inventor: Efraim Ramon, Be'er Ya'akov (IL)

(73) Assignee: LESICO TECHNOLOGIES LTD., Holon (IL)

( * ) Notice: Subject to any disclaimer, the term of this patent is extended or adjusted under 35 U.S.C. 154(b) by 994 days.

(21) Appl. No.: 13/380,967

(22) PCT Filed: Jun. 27, 2010

(86) PCT No.: PCT/IL2010/000517
§ 371 (c)(1),
(2), (4) Date: Dec. 27, 2011

(87) PCT Pub. No.: WO2010/150268
PCT Pub. Date: Dec. 29, 2010

(65) Prior Publication Data
US 2012/0097341 A1    Apr. 26, 2012

(30) Foreign Application Priority Data

Jun. 25, 2009    (IL) .......................................... 199570

(51) Int. Cl.
*B01D 1/22*    (2006.01)
*B01D 1/30*    (2006.01)
(Continued)

(52) U.S. Cl.
CPC    *B01D 1/22* (2013.01); *B01D 1/221* (2013.01); *B01D 1/30* (2013.01); *C02F 1/048* (2013.01); *C02F 1/08* (2013.01); *Y10T 29/49826* (2015.01)

(58) Field of Classification Search
CPC ............ B01D 1/22; B01D 1/221; B01D 1/30; C02F 1/08; C02F 2201/002; F25B 39/00; F25B 39/02; F25B 39/022; F25B 39/024; F25B 39/026; F25B 39/028; B21D 53/02; B21D 53/06; B21D 53/08; B23P 15/26
USPC ................................ 159/5, 13.1, 32, 43.1, 49
See application file for complete search history.

(56) References Cited

U.S. PATENT DOCUMENTS

| 1,056 A | 12/1838 | Harrison |
| 1,775,036 A | 9/1930 | Dunning |

(Continued)

FOREIGN PATENT DOCUMENTS

| AU | 2009100600 | 9/2009 |
| CA | 2237559 | 12/1998 |

(Continued)

OTHER PUBLICATIONS

PCT/IL2010/000517, Jan. 25, 2011, International Search Report and Written Opinion.

(Continued)

*Primary Examiner* — In Suk Bullock
*Assistant Examiner* — Jonathan Miller
(74) *Attorney, Agent, or Firm* — Dorsey & Whitney LLP

(57) ABSTRACT

A method of assembly of an evaporation assembly module. The evaporation assembly module comprises an evaporation element, a pipe having at least one fluid outlet and configured for wetting at least a portion of the evaporation element by passing fluid through the fluid outlet, and a support structure configured for holding the evaporation element in a suspended position. The method includes connecting the pipe to the evaporation element and subsequently suspending the pipe and the connected evaporation element to the support structure, in a suspended position.

17 Claims, 9 Drawing Sheets

(51) Int. Cl.
*C02F 1/04* (2006.01)
*C02F 1/08* (2006.01)

(56) References Cited

U.S. PATENT DOCUMENTS

| | | | |
|---|---|---|---|
| 2,843,536 A | | 7/1958 | Mount |
| 3,211,633 A | * | 10/1965 | Hammer et al. ............ 202/236 |
| 3,282,797 A | | 11/1966 | Hammer |
| 3,980,527 A | | 9/1976 | Lapeyre |
| 3,992,246 A | | 11/1976 | Welch |
| 4,001,077 A | | 1/1977 | Kemper |
| 4,079,585 A | | 3/1978 | Helleur |
| 4,495,034 A | | 1/1985 | Lucas |
| 4,704,189 A | | 11/1987 | Assaf |
| 5,188,550 A | | 2/1993 | Oliver |
| 5,316,626 A | | 5/1994 | Guy |
| 6,000,684 A | | 12/1999 | Pasch et al. |
| 6,440,275 B1 | | 8/2002 | Domen |
| 6,500,216 B1 | | 12/2002 | Takayasu |
| 7,166,188 B2 | | 1/2007 | Kedem et al. |
| 8,088,257 B2 | * | 1/2012 | Kemp ............................ 202/234 |
| 8,580,085 B2 | * | 11/2013 | Kemp ............................ 203/10 |
| 2004/0141810 A1 | | 7/2004 | Lysne |
| 2012/0247688 A1 | | 10/2012 | Gilron et al. |

FOREIGN PATENT DOCUMENTS

| | | |
|---|---|---|
| EP | 34920 | 9/1981 |
| EP | 340482 | 11/1989 |
| ES | 2024097 | 2/1992 |
| GB | 2330779 | 5/1999 |
| WO | WO 2007/060530 | 5/2007 |
| WO | WO2009129572 | 10/2009 |

OTHER PUBLICATIONS

Compass Minerals; "Solar Evaporation" http://www.compassminerals.com/products-services/production/solar-evaporation/ ; 1 page; accessed Sep. 11, 2014.

SQM; "Production Process" http://www.sqm.com/en-us/acercadesqm/recursosnaturales/procesodeproduccion/caliche.aspx ; 2 pages; accessed Sep. 11, 2014.

Avivapure—"ECUBE Brine Evaporation Accelerator Saves Money" http://www.avivapure.com/au/NEWS.aspx ; 6 pages; Accessed Sep. 4, 2014.

Gilron et al. "Environmentally acceptable technologies for ZLD of Coal Seam Gas water"; Presentation to Coal Seam Gas Conference, Jun. 2010, 34 pages.

Katzir et al. "WAIV—Wind aided intensified evaporation for brine voume reduction and generating mineral byproducts" Desalination and Water Treatment; 13 (2010) 63-73.

"Industrial Minerals and Rocks: Commodities, Markets and Uses" by Jessica Elzea Kogel (Editor), Nikhil C. Trivedi (Editor), James M. Barker (Editor), Stanley T. Krukowsk (Editor); Publisher: Society for Mining Metallurgy & Exploration; 7 edition (Mar. 5, 2006), pp. 605-606 (relevant pages enclosed).

Gilron et al. "WAIV—wind aided intensified evaporation for reduction of desalination brine volume" Desalination 158 (2003) 205-214.

Belfer et al. "Modification of NF Membranes for Operation in Tertiary Wastewater Effluents" (2003); pp. 213-224.

International Search Report from International Application No. PCT/IL2010/000946 mailed May 9, 2011.

* cited by examiner ably module for increasing evaporation of liquid from a body of liquid, the evaporation assembly module comprising a single evaporation element having an apex, a pipe associated with the apex and a support structure configured for holding the evaporation element in a suspended position; the evaporation element comprising at least two evaporation members each having an uppermost end and a lowermost end, the uppermost ends of all the members being associated with said apex; the pipe being configured for wetting the evaporation members; each evaporation member being free of connection to another such evaporation member at least at its lowermost end.

EVAPORATION ASSEMBLY MODULE, ELEMENTS AND METHOD OF CONSTRUCTION THEREOF

CROSS-REFERENCE TO RELATED APPLICATIONS

This application is a U.S. Nationalization of PCT International Application No. PCT/IL2010/000517 filed on 27 Jun. 2010, which claims priority to Israel Patent Application No. 199570 filed on 25 Jun. 2009, the contents of each of the foregoing applications are incorporated herein, in their entirety, by this reference.

FIELD

The subject matter of the present application relates to an evaporation assembly module, evaporation elements for use therein using wind to increase the rate of evaporation from outdoor ponds, and a method of construction thereof.

BACKGROUND

Evaporation assemblies can be used in outdoor ponds where wastewater is stored and where evaporation is needed to concentrate the waste for further treatment. These ponds present an environmental challenge, as leakage from such ponds can lead to serious groundwater contamination. The requirements of environmental authorities regarding the quality of lining of such ponds are becoming more stringent and therefore the costs thereof tend to increase. For these reasons, there exists a need to reduce the number and size of such evaporation ponds by increasing the rate of evaporation therefrom.

Increasing the evaporation from ponds is also advantageous in the production of solid products like salts and minerals.

Known means of increasing evaporation from ponds of the above specified kinds include the use of spray nozzles to force the pond water into the air as a spray.

SUMMARY

The subject matter of the present application comprises a plurality of aspects, each of which being inventive in itself. Each aspect can be used in combination with other aspects described herein or used independently thereof. Various inventive aspects of the subject matter of the present application will now be described.

Evaporation Assembly Module

In accordance with a first aspect of the subject matter of the present application, there is provided an evaporation assembly module for increasing evaporation of liquid from a body of liquid, the evaporation assembly module comprising a single evaporation element having an apex, a pipe associated with the apex and a support structure configured for holding the evaporation element in a suspended position; the evaporation element comprising at least two evaporation members each having an uppermost end and a lowermost end, the uppermost ends of all the members being associated with said apex; the pipe being configured for wetting the evaporation members; each evaporation member being free of connection to another such evaporation member at least at its lowermost end.

The evaporation element can be held in the suspended position with every point on an evaporation member being disposed at a height equal to or lower than another point which disposed is closer to the uppermost end on the evaporation member. The evaporation element can be held in the suspended position with every point on an evaporation member being disposed or lower than another point which disposed is closer to the uppermost end on the evaporation member.

It will be understood from the above that the evaporation member can form a shape which is free of a trough-shaped portion (as occurs, for example, with elements held in a W-shaped position) thereby avoiding the formation of a trough-shaped element or receptacle-like shape which accumulates minerals thereon. The support structure can be configured to hold the lowermost ends of all of the members in fixed positions spaced point from each other.

The support structure can be configured to hold the evaporation element in a taut state, wherein an evaporation member of the evaporation element is held in a planar position.

The support structure can be configured to hold the at least two evaporation members in the form of an upside down V-shape or U-shape, when viewed in a side view of the evaporation element.

In accordance with a further aspect of the subject matter of the present application, there is provided an evaporation assembly module for increasing evaporation of liquid from a body of liquid, the evaporation assembly module comprising a single evaporation element having an evaporation member, a pipe configured for wetting the evaporation member, and a support structure configured for holding the evaporation element in a suspended position; the support structure comprising a beam mounted on a plurality of columns and a hanging element configured for suspending, from the beam, at least a portion of the evaporation element and at least a portion of the pipe.

The evaporation assembly module in accordance with any aspects described above can comprise or be associated with any of the features of the other aspect of the subject matter of the present application described hereinabove and below. For example, the evaporation assembly module in accordance with the latter aspect above can comprise an evaporation element of the type described in connection with the prior aspect above. By way of another example, the evaporation assembly module in accordance with the prior aspect above can comprise a support structure of the type described in connection with the latter aspect above.

Support System for Evaporation Assembly

The support structures of the modules described above can be connected to form a single support structure for an evaporation assembly comprising these modules.

Alternatively, or in addition, there can be provided, in accordance with another aspect of the subject matter of the present application, a support system comprising interconnected vertical columns arranged so that each of the columns is located at an intersection of first and second imaginary horizontal lines which are perpendicular to each other and along which corresponding first and second pluralities of parallel columns are arranged, the first plurality of parallel columns having a greater number of columns than the second plurality of parallel columns; each column having at least one section extending along at least a majority of the column's vertical dimension, at which, in the horizontal cross-section thereof, the largest dimension is perpendicular to the first imaginary horizontal line along.

The arrangement above can provide a support system configured for operating in an area of high-wind forces with a sufficiently strong structure to resist such wind-forces applied on the support system from multiple directions.

The support system can further comprise a plurality of horizontal beams held in a suspended position via the interconnected vertical columns, each beam having at least one section extending along at least a majority of the beam's horizontal dimension, at which, in the vertical cross-section thereof, the largest dimension is vertical.

The arrangement above can provide a support system configured for holding heavy evaporation elements, which are normally wetted, with sufficient strength to bear the load of such evaporation elements.

Notably, the beams can be more closely spaced to each other than the columns are to each other.

The at least one section of the beams or columns can be a web.

Regarding the beams or columns, each can have:
a web having a width magnitude at least 8 times larger than the magnitude of thickness thereof;
flanges disposed such that an asymmetric cross sectional shape is formed about the width axis of the web;
a Z profile cross section (also known as an S profile cross section) formed by to the web and flanges thereof;
a C profile cross section (also known as a U profile cross section) formed by the web and flanges thereof;
an I profile cross section formed by the web and flanges thereof;

Asymmetric cross sectional cross sections, such as Z and C profile cross sections, can be better suited to support systems in accordance with the subject matter of the application.

The beams or columns can be made of any suitable rigid material, for example metal or fiberglass.

A majority of the beams and columns can be connected to each other via the use of mechanical fasteners. All of the beams and columns can be connected via the use of mechanical fasteners. The mechanical fasteners can be rivets, bolts snap locks, etc. It will be understood that connection of the beams and columns can be made completely free of welded connections. Similarly, the connection of a majority, or all, of the elements of the support system can be made via the use of such mechanical fasteners.

The support system can comprise further support members configured for connecting the columns or beams. The support members can be cylindrical.

The elements, such as the beams, columns and support members of the support system, can be solid elements. For the purposes of the specification and the claims, the term "solid elements" means elements which are free of internal hollow area. Such construction can be better suited for being coated against detrimental substances. Such construction can be less prone to collapsing due to minerals which evaporation assembly modules are exposed too.

The first plurality of parallel columns can form one of a plurality of lines of columns, the number of the plurality of lines being an odd number.

In accordance with still another aspect of the subject matter of the present application, there is provided a support system arranged with a plurality of parallel lines of columns, the number of the plurality of lines being an odd number. For example there can be three lines in the plurality of lines.

For example, a support system having three parallel lines of columns, and an evaporation element suspended between adjacent pairs of columns, can suspend:
double the number of evaporation elements than a similar support system having two parallel lines of columns; and
the same number of evaporation elements as a similar support system having four parallel lines of columns.

Notably, a support system with an odd number of parallel lines of columns can allow a greater number of evaporation elements to be suspended in a reduced area. The reduced area can also reduce the area of contamination reached by operation of the evaporation assembly module or assembly.

In accordance with still another aspect of the subject matter of the present application, there is provided a support structure for holding at least two evaporation elements, each having an evaporation surface with uppermost and lowermost edges, and two side edges extending therebetween, the support system being configured to hold said evaporation elements so that one of the two side edges of one of the evaporation surfaces of one of the elements is adjacent to one of the side edges of one evaporation surface of the other element, and the uppermost and the lowermost edges of the evaporation surfaces of the two elements are coplanar.

The support structures and systems in accordance with any of the aspects described above can comprise or be associated with any of the features of the other aspects of the subject matter of the present application described hereinabove and below. For example the support structures and systems can use the same types of beams and columns, connections therebetween, and orientations thereof.

Evaporation Elements

In accordance with yet another aspect of the subject matter of the present application, there is provided an evaporation element comprising a sleeve portion and at least one evaporation member having at least one evaporation surface and extending from the sleeve portion.

Such sleeve portion can reduce environmental hazards by preventing spray drops from a pipe within the sleeve portion from being blown by the wind beyond a catchment area of the pond to open ground, where the drops can then percolate down to the water table with their load of contaminants.

An evaporation element having a sleeve portion can be produced using material having a planar shape.

A method of producing the evaporation element can include:
folding a planar shaped material along a folding line to form two evaporation members extending therefrom; and
joining the two evaporation members along a merging line spaced from the folding line and parallel thereto, to thereby form a sleeve portion.

The size of the sleeve portion can be configured to correspond to the size of a predetermined diameter of a pipe intended to be inserted in the sleeve portion.

The joining of the two evaporation members can be facilitated by them being sewn together along the merging line.

The sleeve portion can be double-layered.

The above-mentioned reduction of spray drops blown by the wind can be further reduced when a double-layered sleeve portion is utilized.

The sleeve portion can be configured to prevent liquid flow in a direction away from an evaporation member.

The evaporation member can be made from a shade net. The shade net can be configured for at least 85% shade. Shade nets can be advantageous to use as part of an evaporation element, as they can withstand the load of the liquid and minerals accumulating thereon during evaporation of liquid, and can also withstand continuing exposure to environmental conditions and the minerals from the liquid.

The evaporation surface of the evaporation member can be wettable by liquid and at least partially exposable to wind when wetted, so as to allow evaporation of said liquid from said evaporation surface. The evaporation surface of the evaporation element can be hydrophilic. For example, the evaporation surface can be a surface of an evaporation member made of a hydrophilic material. Such material being hydrophilic before the member is formed. Alternatively, the evaporation surface of the evaporation element can be a surface of an evaporation member made of a non-hydrophilic base material, the base material being coated with a hydrophilic coating or chemically treated to make the evaporation surface thereof hydrophilic. Such coating or chemical treatment being known in the art per se.

For the purposes of the specification and claims an evaporation surface is considered to be hydrophilic if a drop of water placed on the surface makes a nominal contact angle of 70 degrees or less.

The evaporation member can have a sheet-like or planar shape.

The at least one evaporation member can be two or more evaporation members. The two or more evaporation members can each have a first end which is associated with an apex of the evaporation element.

Each the at least one evaporation members can comprise at least two evaporation surfaces. The use of an evaporation member having two evaporation surfaces can allow an increased rate of evaporation of the liquid from a single evaporation member.

The evaporation element can be configured to be connected to a brace element, further details of brace elements being provided hereinafter. In a case where the brace element is an elongated element, such as a pipe, the evaporation member can be configured with a tubular portion formed at a lowermost portion thereof for receiving the brace element therethrough.

In accordance with still a further aspect of the subject matter of the application, there is provided an evaporation element having an apex constituting an uppermost ridge portion two evaporation members extending from the ridge portion, each member having an evaporation surface.

The ridge portion can have any suitable shape such as straight, round, pointed, etc.

The evaporation elements in accordance with any of the aspects described above can comprise or be associated with any of the features of the other aspects of the subject matter of the present application described hereinabove and below.

Brace Element

According to a further aspect of the subject matter of the present invention, there is provided a support structure or system comprising a brace element, the brace element being configured to secure a lowermost end of an evaporation element's evaporation member to the support structure or system in a static configuration.

The brace member can prevent damage and wear to the evaporation element, such damage and wear being caused by motion of the evaporation element due to wind forces applied thereon. The brace member can also prevent environmental contamination which can be caused by motion of the evaporation element, due to wind forces thereon, which cause droplets on the evaporation element to become airborne.

It will be understood that the evaporation element can be made of flexible material and consequently it is possible that a portion thereof spaced from the end which is secured via the brace element can be capable of some movement.

The brace element can be an elongated brace element, for example a pole or pipe.

The brace element can be made of polyethylene.

The brace element can be configured to be mounted to the support structure or system via at least one column or support member thereof. The brace element can be connected to the at least one column or support member via a pipe connector, known in the art per se.

In a case where there are two members extending from an apex of a single evaporation element, two brace elements can be configured to hold the evaporation members thereof in, such that the members and ridge form an upside down V-shape.

Hanging Element

In accordance with yet another aspect of the subject matter of the present application, there is provided a hanging element comprising a first end and a second end, the first end being configured for simultaneously holding at least a portion of an evaporation element and at least a portion of a pipe, and the second end of the hanging element being configured for attachment to a beam.

The hanging element can be elastic and flexible. For example, the hanging element can be made of metal. Such elasticity and flexibility can allow an evaporation element connected to the hanging element to move with respect to the beam. It will be understood that wind can cause movement of the evaporation element, and by the hanging element flexing and elastically reverting to its original position, both damage to a possibly tearable evaporation element and permanent change of position thereof can be avoided.

The hanging element can be configured to surround a radial edge of the at least portion of the pipe by at least 240 degrees. This can reduce the amount of undesired spray drops from moving in a direction away from an evaporation assembly module or element.

The first end of the hanging element can comprise an elongated end configured for insertion through the evaporation element. In a case where the evaporation element comprises two evaporation members extending from a sleeve or ridge portion thereof, the elongated end can be sized for insertion through both of the two evaporation members. The elongated end of the hanging element can be curved to receive a curved radial edge of a pipe thereon.

The evaporation element can be formed with at least one aperture and the elongated edge can be sized to be inserted through the at least one aperture. The aperture can be formed in an evaporation member of the evaporation element. There can be two apertures formed in an evaporation element.

The second end of the hanging element can be configured for connection to a beam by comprising an elongated portion configured for insertion through an aperture formed in the beam.

An advantage of using a beam formed with an aperture to suspend at least a portion of an evaporation element via a hanging element can be that sliding of the evaporation element with respect to the beam can be avoided.

When the beam has a Z or C profile cross section, and the beam is connected to a hanging element, such connection can be made with a lowermost flange of the beam extending in a first direction away from the web and an end of the hanging element connected to the beam extending from the web in a direction away from the first direction.

In such case the flange of the beam and the end of the hanging element can jointly shield against undesired upwardly directed spray drops from a pipe held by the hanging element, thereby reducing the possibility of environmental contamination.

Liquid Distribution System

According to still a further aspect of the subject matter of the present application, there is provided a liquid distribution system comprising:

- a plurality of parallel wetting pipes configured to wet evaporation members disposed underneath the pipes, each wetting pipe having two ends;

a feed pipe having two opposite manifold sections between which the pipes extend and to which the ends of the pipes are connected in fluid communication, each manifold section having two ends between which all their connections to the pipes are located, and two opposite bridging sections extending between corresponding ends of the manifold sections;

a fluid inlet configured to be in fluid communication with an external fluid source and located in one of the bridging sections of the feed pipe; and said wetting pipes having associated fluid outlets for wetting said evaporation elements therethrough, and being in fluid communication with the manifold sections.

A liquid distribution system of the construction described can enable a uniform pressure through the wetting pipes and feed pipe thereof, allowing uniform wetting of all evaporation elements associated with the liquid distribution system. Uniform wetting of all evaporation elements in an evaporation module or assembly can allow greater efficiency of the system by avoiding dry portions of evaporation elements on one hand, and excessive flow rate through the system on the other.

The wetting pipes can be oriented horizontally.

The feed pipe can be oriented horizontally.

The manifold sections can comprise junctions. Each junction can have three ports. The three ports can include a first port in fluid communication with a downstream portion of the manifold section, a second port in fluid communication with an upstream downstream portion of the manifold section, and a third port in fluid communication with one of the wetting pipes.

The fluid inlet can be disposed in the middle of a bridging section, such that it is an equal distance from each manifold section.

A junction connecting the fluid inlet and the bridging section can be configured to allow liquid to enter the bridging section towards both manifold sections simultaneously. The junction connecting the fluid inlet and the bridging section can comprise three ports. The three ports can include a first port in fluid communication with an inlet pipe, a second port in fluid communication with a manifold section, and a third port in fluid communication with the other manifold section.

An advantage of the fluid inlet being disposed on a portion of the feed pipe spaced from the junctions can be that a greater uniformity of pressure distribution can be created through the wetting pipes. The uniformity of the pressure distribution can be greater than would be the case if the fluid inlet would be disposed on one of the manifold sections of the feed pipe between two junctions which are connected to the wetting pipes.

One of the fluid outlets associated with one of the wetting pipes can be in the form of at least one opening formed in the wetting pipe and configured for drip flow therethrough. The at least one opening can be in the form of a plurality of apertures formed in the wetting pipe, each aperture being spaced from an adjacent aperture along an imaginary longitudinal axis passing through the wetting pipe.

Alternatively, the at least one opening can be in the form of a slit formed in the wetting pipe. The at least one opening in the wetting pipe can be a single longitudinal slit. In such case the slit can extend along a majority of the wetting pipe, parallel to an imaginary longitudinal axis passing through the wetting pipe.

Still another alternative includes that the at least one opening can be in the form of two or more apertures formed in the wetting pipe, each spaced from each other along a plane perpendicular to an imaginary longitudinal axis passing through the wetting pipe.

The at least one opening can be a combination of the alternative arrangements described above.

Advantageously the at least one pipe can be free of a mechanical device configured to pour or spray the liquid from the pipe onto the evaporation element. It will be understood that the liquid distribution system above can be configured to provide a drip flow to wet the evaporation elements. Consequently the wetting pipe can be free of mechanical devices associated therewith which are configured to wet the evaporation elements thereof.

The liquid distribution system can be free of a mechanical device other than a pipe which is configured for wetting an evaporation element.

When the liquid distribution system is mounted on a support structure or system, the at least one opening can be oriented to allow liquid to pass therethrough in a desired direction. For example, the at least one opening can be orientated so that it faces upwardly. In such case the liquid passing therethrough will move in an upward direction when exiting the wetting pipe. The at least one opening can be oriented so that it faces a proximal portion of an evaporation member of an evaporation element. The at least one opening can be orientated to face about 45 degrees above or below a horizontal plane. The at least one aperture can be two apertures each spaced from each other along a plane perpendicular to an imaginary longitudinal axis passing through the pipe, and in such case both of the apertures can be orientated to face about 45 degrees above or below a horizontal plane.

The liquid distribution system can further comprise a relief outlet pipe having a first end in fluid communication with one of the bridging sections of the feed pipe, a second end open to atmosphere, and an intermediate portion extending between the first and second ends, at least a portion of the intermediate portion being configured to extend to a height above the bridging section in fluid communication with the first end.

The intermediate portion can be configured to extend to a height above the feed pipe and wetting pipes.

The relief outlet pipe can provide the function of allowing regulation of the liquid flow rate in accordance with a visual indication of the hydrostatic head in the liquid distribution system.

The relief outlet pipe can be configured with the second end disposed above the feed pipe. For example, the relief outlet pipe can be a straight pipe extending upwardly from the feed pipe to which it is connected. Such design can allow a user to see liquid exiting the relief outlet pipe from a distance and regulate flow rate through the liquid distribution system.

Alternatively, the relief outlet pipe can further comprise a downwardly directed portion configured to dispose the second end thereof at a height below the bridging section in fluid communication with the first end.

The intermediate portion thereof can be configured to extend to a height below the feed pipe and wetting pipes.

Such design can enable the relief outlet pipe to guide liquid flow exiting therefrom to the ground, for example to a catchment area.

Such configuration can reduce the amount of drops being blown away from the liquid distribution system, and hence reduce the environmental damage caused thereby.

The first end of the relief outlet pipe can be disposed in the middle of a bridging section, such that it is an equal distance from each manifold section. The first end of the relief outlet pipe can be on a bridging section other than a bridging section with which the fluid inlet is associated.

A junction connecting the first end of the relief outlet pipe and the bridging section can comprise three ports. The three ports can include a first port in fluid communication with the first end of the relief outlet pipe, a second port in fluid communication with a portion of the bridging section adjacent to a manifold section, and a second port in fluid communication with a portion of the bridging section adjacent to another manifold section.

The liquid distribution system can further comprise an inlet pipe one end of which is constituted by the fluid inlet.

The inlet pipe can comprise a first valve for regulating flow from a body of liquid to be evaporated, and a second valve for regulating flow from an alternate liquid source.

The alternative liquid source can be a liquid suitable for cleaning the fluid distribution system. In such case the first valve of the inlet pipe can be closed and the second valve opened to flush and/or unclog the liquid distribution system.

Each wetting pipe can be fitted with a valve to change the flow rate therethrough. such valve can also be configured for flushing and/or unclog the wetting pipe.

The distribution system can comprise a filter associated with the inlet pipe or feed pipe associated with the fluid inlet, the filter being configured to prevent clogging in the liquid distribution system by precipitated solids.

The liquid distribution system can be configured to avoid wetting outer surfaces of an associated evaporation assembly or evaporation assembly module, the outer surfaces being substantially parallel to evaporation surfaces of evaporation elements associated with the liquid distribution system.

Such configuration can be achieved by the evaporation assembly module being free of a pipe configured for wetting adjacent the outer surfaces or by restricting liquid via valves to these areas. Such arrangement can be advantageous in preventing liquid drops being blown off these surfaces and away from the evaporation assembly module.

The liquid distribution system in accordance with any of the aspects described above can comprise or be associated with any of the features of the other aspects of the subject matter of the present application described hereinabove and below.

Method of Assembly of an Evaporation Assembly Module

In accordance with a further aspect of the subject matter of the present application, there is provided a method of assembly of an evaporation assembly module, the evaporation assembly module comprising an evaporation element, a pipe having at least one fluid outlet and configured for wetting at least a portion of the evaporation element by fluid passing through said fluid outlet, and a support structure configured for holding the evaporation element in a suspended position, the method including:
  a) connecting the pipe to the evaporation element; and subsequently
  b) suspending the pipe and the connected evaporation element to the support structure, in a suspended position.

The evaporation element can comprise an apex and at least two evaporation members, each evaporation member having a first end, a second end and an evaporation surface.

The first ends of all the members can be associated with the apex.

It will be appreciated that utilizing an evaporation element with at least two connected evaporation members can advantageously allow more than one evaporation member to be suspended simultaneously.

The step of connecting can further include connecting the pipe to the apex of the evaporation element.

The step of suspending can further include initially connecting a first portion of the evaporation element to the support structure at a first height, and subsequently connecting a second portion of the evaporation element distal to the first portion at a second height which is lower than the first height.

The first portion of the evaporation element can be an apex, sleeve or ridge thereof, and the second portion can be a lowermost end of an evaporation member thereof.

The step of suspending can further include ensuring that the height of every point along each of the two members can be lower than another part of the respective member disposed between said point and the sleeve or ridge portion.

The step of suspending can include securing each end of an evaporation member of the evaporation element which is distal to an apex, sleeve or ridge thereof, to a fixed point spaced from another portion of any evaporation element.

The step of suspending can further include bringing the evaporation element to a taut state, wherein evaporation members thereof are held in a planar disposition.

The step of suspending can further include bringing the evaporation element to the form of an upside down V-shape or U-shape, in a side view of the evaporation element.

The support structure can be part of a support system comprising a plurality of evaporation assembly modules and subsequent to the step of suspending, there can be a further step of suspending at least one additional evaporation element to the support system. The at least one additional evaporation element can comprise, or be suspended with, any of the features described in connection with the evaporation element above.

The evaporation element can be a single evaporation element having an apex and comprising at least two evaporation members each having a first end and a second end, the first ends of all the members being associated with said apex, the method further including connecting the apex to a position at a height above all of the second ends; and suspending the second ends in a position free of connection to another such evaporation member.

The method can further include, wherein the evaporation element comprises a sleeve portion, before step (a) above, connecting the evaporation element to the pipe via slotting the one pipe through to the sleeve portion.

The method can further include, before step (a) above, wherein the at least one evaporation element comprises a sleeve portion, producing the sleeve portion by:
  folding a planar shaped material along a folding line to form two evaporation members extending therefrom; and
  joining the two evaporation members along a merging line spaced from the folding line and parallel thereto, to thereby form a sleeve portion.

The method can further include a step, before step (a) above, of leveling a site where the parallel rows of columns of the evaporation assembly is to be erected. In such case the support structure can be erected at the site which has been leveled.

The support structure can be assembled by suspending a plurality of parallel beams on a plurality of columns, the beams being suspended a predetermined distance apart.

The method can further include assembling the support structure or support system by connecting a plurality of beams and a plurality of columns, a majority of the connecting being carried out via the use of mechanical fastening elements. All of such connecting can be via the use of mechanical fastening.

The method can further include, before step (a), of preparing connection saddle connections for feed pipes a predetermined distance apart.

The method can further include, before step (a) above constructing a support system including the support structure, the support system comprising inter-connected vertical columns arranged so that each of the columns is located at an intersection of first and second imaginary horizontal lines which are perpendicular to each other and along which corresponding first and second pluralities of columns are arranged, the first plurality of columns having a greater number of columns than the second plurality of columns; each column having at least one section extending along at least a majority of the column's vertical dimension, at which, in the horizontal cross-section thereof, the largest dimension is perpendicular to the first imaginary horizontal line along.

The step of constructing the support system can further comprise the subsequent step of suspending a plurality of horizontal beams held in a suspended position via the interconnected vertical columns, each beam having at least one section extending along at least a majority of the beam's horizontal dimension, at which, in the vertical cross-section thereof, the largest dimension is vertical.

The support structure can be configured for holding at least two evaporation elements, each having an evaporation surface with uppermost and lowermost edges, and two side edges extending therebetween, the support structure being configured to hold said evaporation elements so that one of the two side edges of one of the evaporation surfaces of one of the evaporation elements is adjacent to one of the side edges of one evaporation surface of the other element, and the uppermost and the lowermost edges of the evaporation surfaces of the two elements are coplanar.

Stated differently, at least one evaporation surfaces of each of the evaporation elements can be flush with at least one evaporation surface of the other evaporation element.

The method can further include, after step (b) above, connecting an end portion of the at least one evaporation element, distal to an end portion of the evaporation element adjacent the ridge or sleeve portion, to the support system via a brace element configured to arrest movement of the one end to which it is attached.

The method can further include:
  constructing a support system including the support structure; and
  mounting a liquid distribution system thereon in a suspended position, the liquid distribution system including a plurality of parallel wetting pipes configured to wet evaporation members disposed underneath the pipes, each wetting pipe having two ends, a feed pipe having two opposite manifold sections between which the pipes extend and to which the ends of the pipes are connected in fluid communication, each manifold section having two ends between which all their connections to the pipes are located, and two opposite bridging sections extending between corresponding ends of the manifold sections, a fluid inlet configured to be in fluid communication with an external fluid source and located in one of the bridging sections of the feed pipe; and said wetting pipes having associated fluid outlets for wetting said evaporation elements therethrough, and being in fluid communication with the manifold sections.

The method can further comprise, wherein the evaporation assembly module further comprises a hanging element configured to at least partly hold the evaporation element and pipe in a suspended position from a beam of the support structure, step (a) further including connecting the evaporation element and the pipe to the hanging element; and step (b) further including connecting the hanging element to the beam, thereby at least partly suspending both the pipe and the evaporation element simultaneously to the beam in a suspended position.

In accordance with a further aspect, there is provided a method of assembly of an evaporation assembly module having a plurality of columns, at least one beam suspended on the columns, at least one evaporation element having an evaporation surface, at least one pipe configured to wet the at least one evaporation element and a hanging element configured to at least partly hold the at least one evaporation element and at least one pipe in a suspended position from the beam, the method including:
  a) connecting the at least one evaporation element and the at least one pipe to the hanging element; and
  b) connecting the hanging element to the beam, thereby at least partly suspending both the at least one pipe and the at least one evaporation element simultaneously to the beam in a suspended position.

The method can further comprise a step prior to step (a), of pre-manufacturing components of the evaporation assembly module, for example the columns, beams, pipes and evaporation elements, for swift assembly at a desired site.

The methods in accordance with any of the aspects described above can comprise or be associated with any of the features of the other aspects of the subject matter of the present application described hereinabove and below.

BRIEF DESCRIPTION OF THE DRAWINGS

In order to understand the subject matter of the present application and to see how it can be carried out in practice, preferred embodiments will now be described, by way of non-limiting example only, with reference to the accompanying drawings, in which.

DETAILED DESCRIPTION

Figure 1:
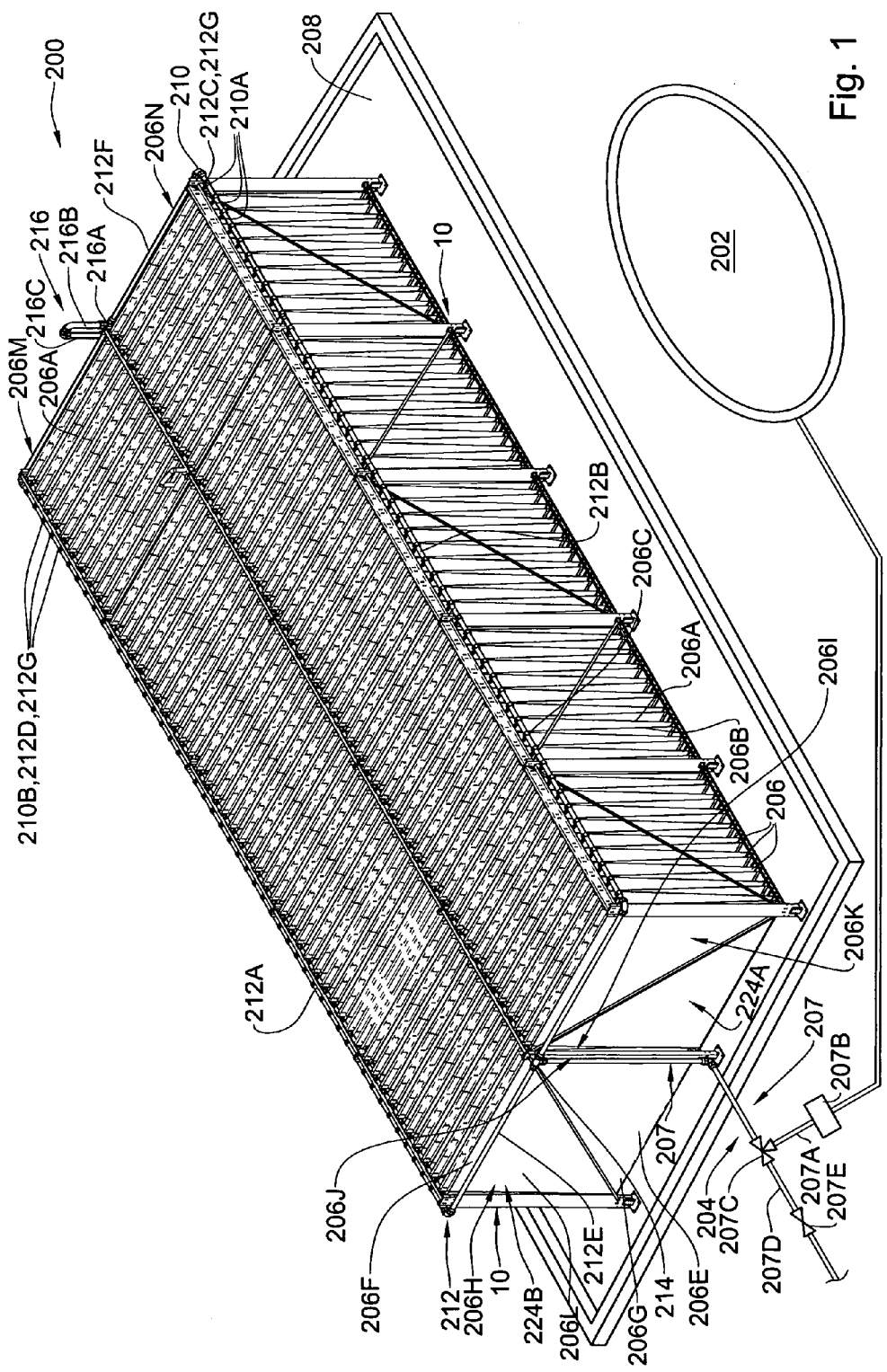
FIG. 1 is a schematic view of an evaporation assembly and pond.

Referring now to the drawings wherein like reference characters designate like or corresponding parts throughout several views, there is shown in FIG. 1 an evaporation assembly generally designated by the numeral 200, configured for using wind to increase the rate of evaporation from an outdoor pond 202.

The evaporation assembly module 200 comprises a support system generally designated as 10, a liquid distribution system generally designated as 204 and evaporation elements 206A.

The evaporation assembly module 200 is disposed within a catchment area 208.

The evaporation elements each comprise two evaporation members (206A,206B), extending downwardly from an apex 206C. Each evaporation element 206 also comprising four evaporation surfaces 206E (only the outermost evaporation surfaces of the four evaporation surfaces of each of the outermost evaporation elements being designated as 206E in this view) with uppermost and lowermost edges (206F,206G), and two side edges (206H,206I) extending therebetween.

It can be seen that the support system comprises two parallel rows (224A,224B) of evaporation elements 206. The support system 10 being configured to hold said evaporation elements 206 so that one of the two side edges (206H, 206I) of one of the evaporation surfaces 206E of one of the evaporation elements 206L is adjacent to one of the side edges (206J) of one evaporation surface of the other element 206K, and the uppermost and the lowermost edges (206F,206G) of the evaporation surfaces of the two elements are coplanar. Similarly, each adjacent pair of evaporation elements in the view shown has coplanar evaporation surfaces.

It should be mentioned that in this example, the liquid distribution system is configured to avoid wetting outer surfaces 206E of the outermost evaporation elements (206K, 206L, 206M, 206N) of an associated evaporation assembly or evaporation assembly module, the outer surfaces 206 being substantially parallel to evaporation surfaces of evaporation elements associated with the liquid distribution system.

The liquid distribution system comprises the following elements.

A plurality of parallel horizontal wetting pipes 210 configured to wet the evaporation members (206A,206B) disposed underneath the pipes 210, each wetting pipe 210 having two ends (210A,210B).

A horizontal feed pipe generally designated as 212, having two opposite manifold sections (212A,212B) between which the pipes 210 extend and to which the ends (210A,210B) of the pipes 210 are connected in fluid communication, each manifold section (212A,212B) having two ends (212C,212D) between which all their connections to the pipes are located, and two opposite bridging sections (212E,212F) extending between corresponding ends of the manifold sections.

An inlet pipe generally designated as 207, one end of which constitutes a fluid inlet 214 of the system 200. The fluid inlet 214 is disposed in the middle of a bridging section 212E of the feed pipe and configured to be in fluid communication with an external fluid source. The inlet pipe 207 having a first branch line 207A in fluid connection with the pond 202 and a second branch line 207D in fluid connection with an alternate liquid source (not shown). The first branch line 207A comprising a pump 207B for drawing liquid from the pond and into the feed pipe 212 via a first valve 207C associated with a junction between the first branch line 207A and second branch line 207D. The second branch line 207D comprising a second valve 207E for drawing liquid from the alternate liquid source. The alternative liquid source can be a liquid suitable for cleaning the fluid distribution system, such as water. In operation the first valve 207C can be closed and the second valve 207E opened to flush and/or unclog the liquid distribution system 200. Or the first valve 207C can be opened and the second valve 207E closed to flush and/or unclog the liquid distribution system 200

Each wetting pipe can 210 be fitted with a valve (not shown) configured to change the flow rate through the pipe 210 for appropriate flushing and/or unclog the wetting pipe.

The wetting pipes 210 have associated fluid outlets (not shown, see FIGS. 5A to 5E for various configurations of the fluid outlets) for wetting said evaporation elements 206 therethrough, and being in fluid communication with the manifold sections 212.

The manifold comprises a plurality of junctions 212G via which the fluid inlet and wetting pipes are connected. Each junction has three ports allowing flow therethrough in three directions, depending on the pressure across each port.

The liquid distribution further comprises a relief outlet pipe generally designated as 216, and having a first end (not shown, the three port junction of the first end to the feed pipe being designated as 216A) in fluid communication with one of the bridging sections 212F of the feed pipe, a second end open to atmosphere (not shown), and an upwardly extending intermediate portion 216B, and a downwardly extending intermediate portion 216C. Both intermediate portions extend between the first and second ends. The upwardly extending intermediate portion 216B extends to a height above the bridging section in fluid communication with the first end and the feed pipe and wetting pipes. The downwardly extending intermediate portion 216C is configured to direct liquid flow exiting from the second end to the catchment area 208.

Figure 6:
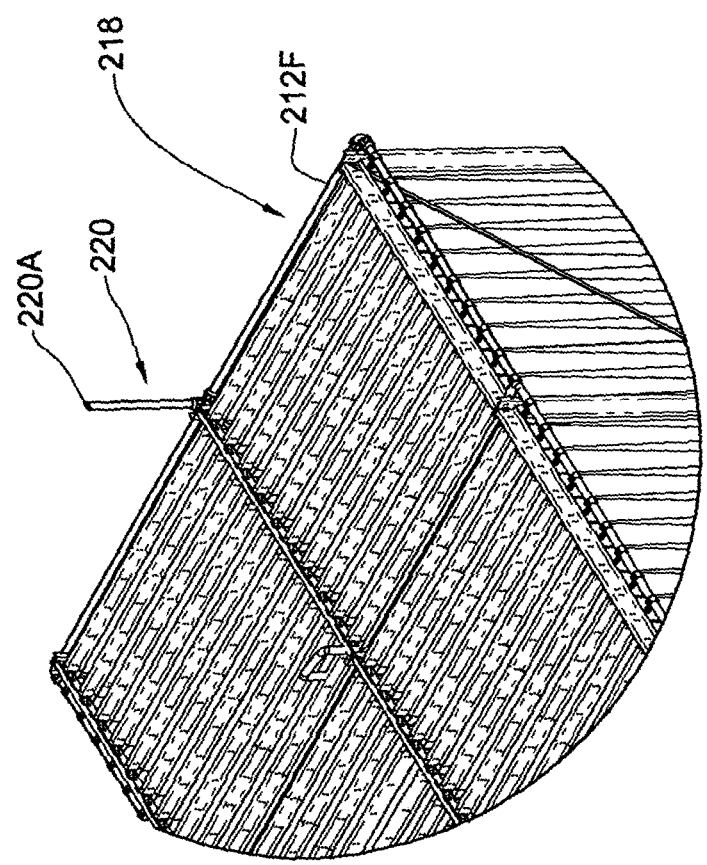
FIG. 6 is a partial schematic view of an evaporation assembly module similar to that shown in FIG. 1, with the exception of the construction of the relief outlet pipe.

Referring briefly to FIG. 6, there is shown an evaporation assembly generally designated as 218, which is identical to the evaporation assembly in FIG. 1 with the exception of the relief outlet pipe 220. In the evaporation assembly 218, the relief outlet pipe 220 is a straight pipe extending upwardly from a middle point of a bridging section 212F of the feed pipe 212 to which it is connected. In the present view the second end 220A of the relief outlet pipe can be seen, allowing a user to see liquid (not shown) exiting the relief outlet pipe from a distance and regulate flow rate through the liquid distribution system.

Figure 1A:
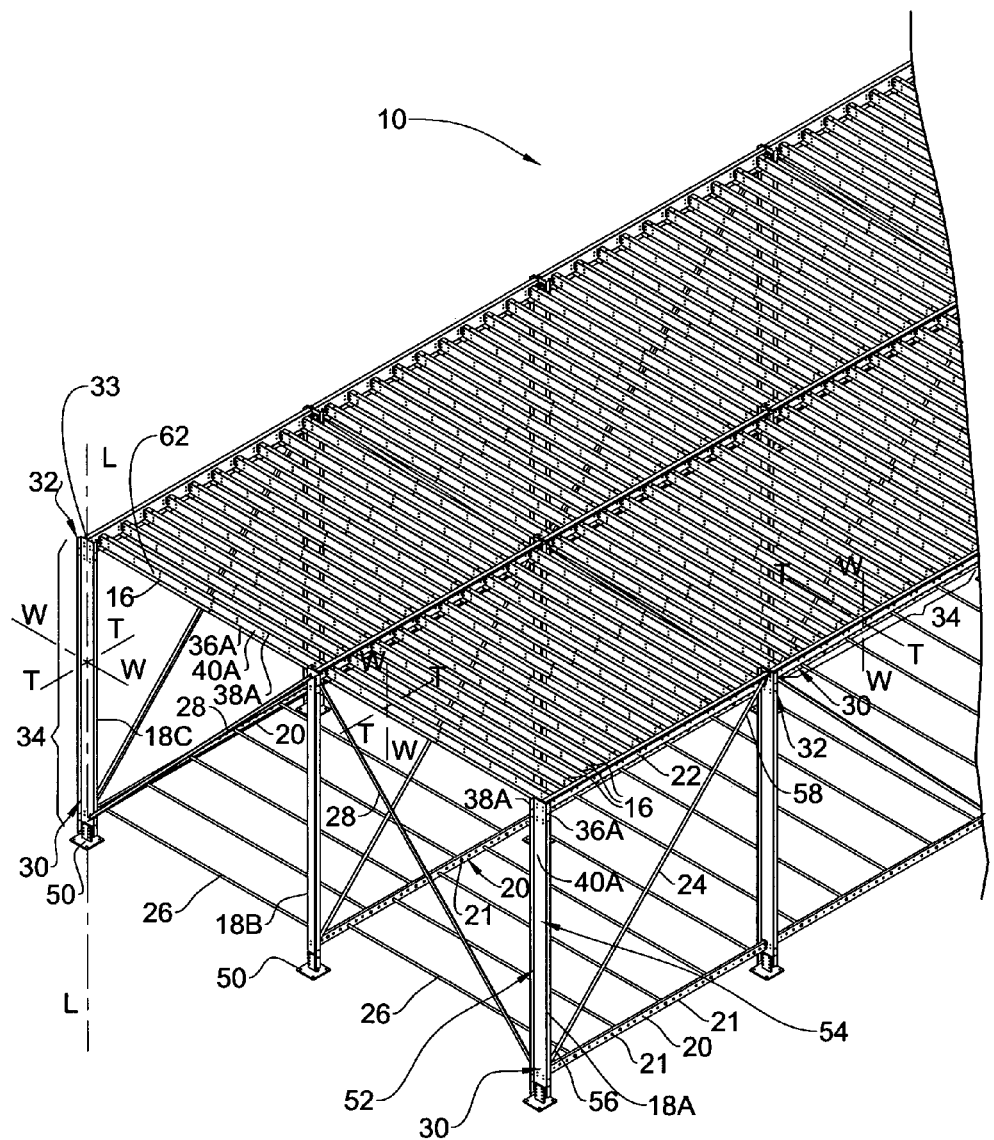
FIGS. 1A and 1B are complimentary partial perspective views of a support system of the evaporation assembly in FIG. 1.
Figure 1B:
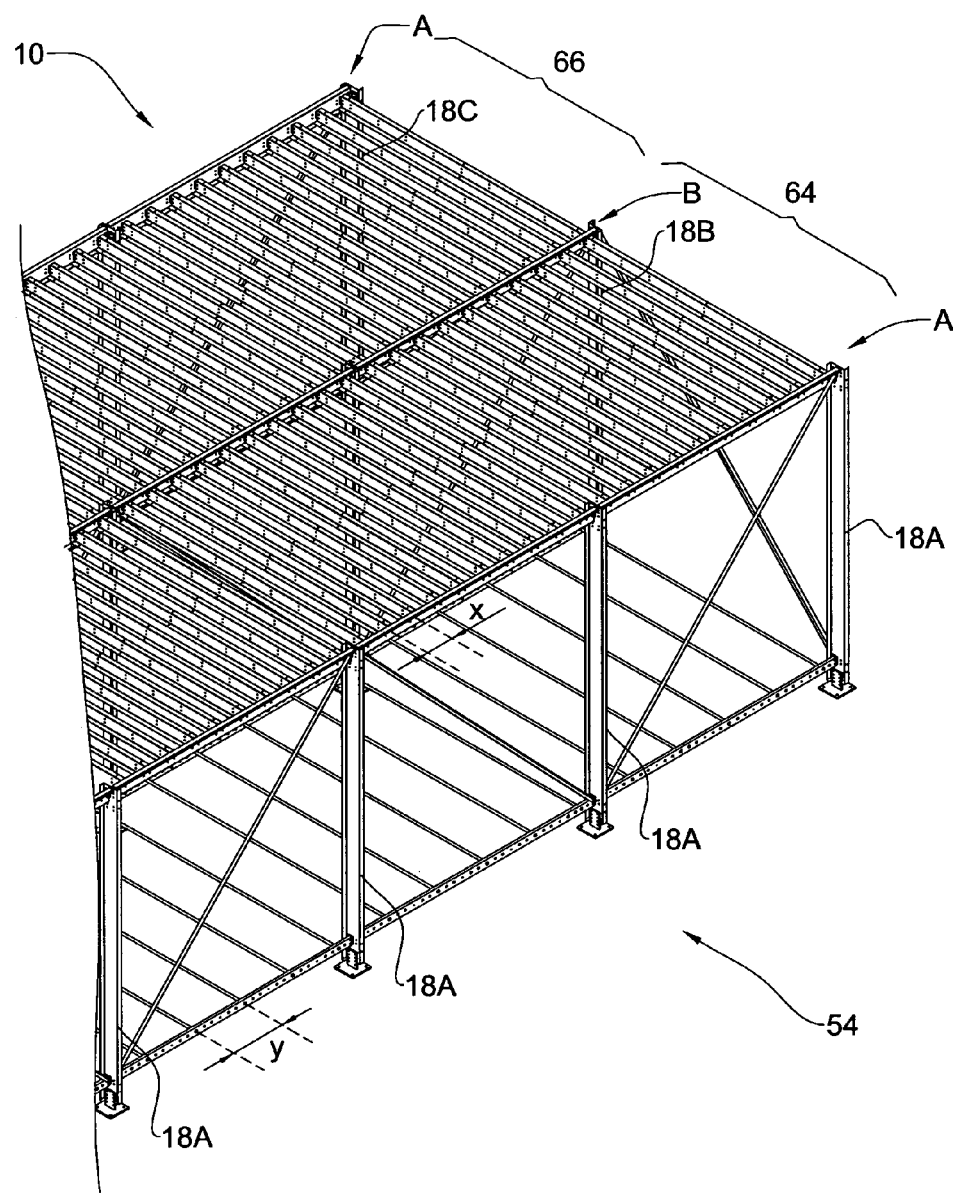
Figure 1C:
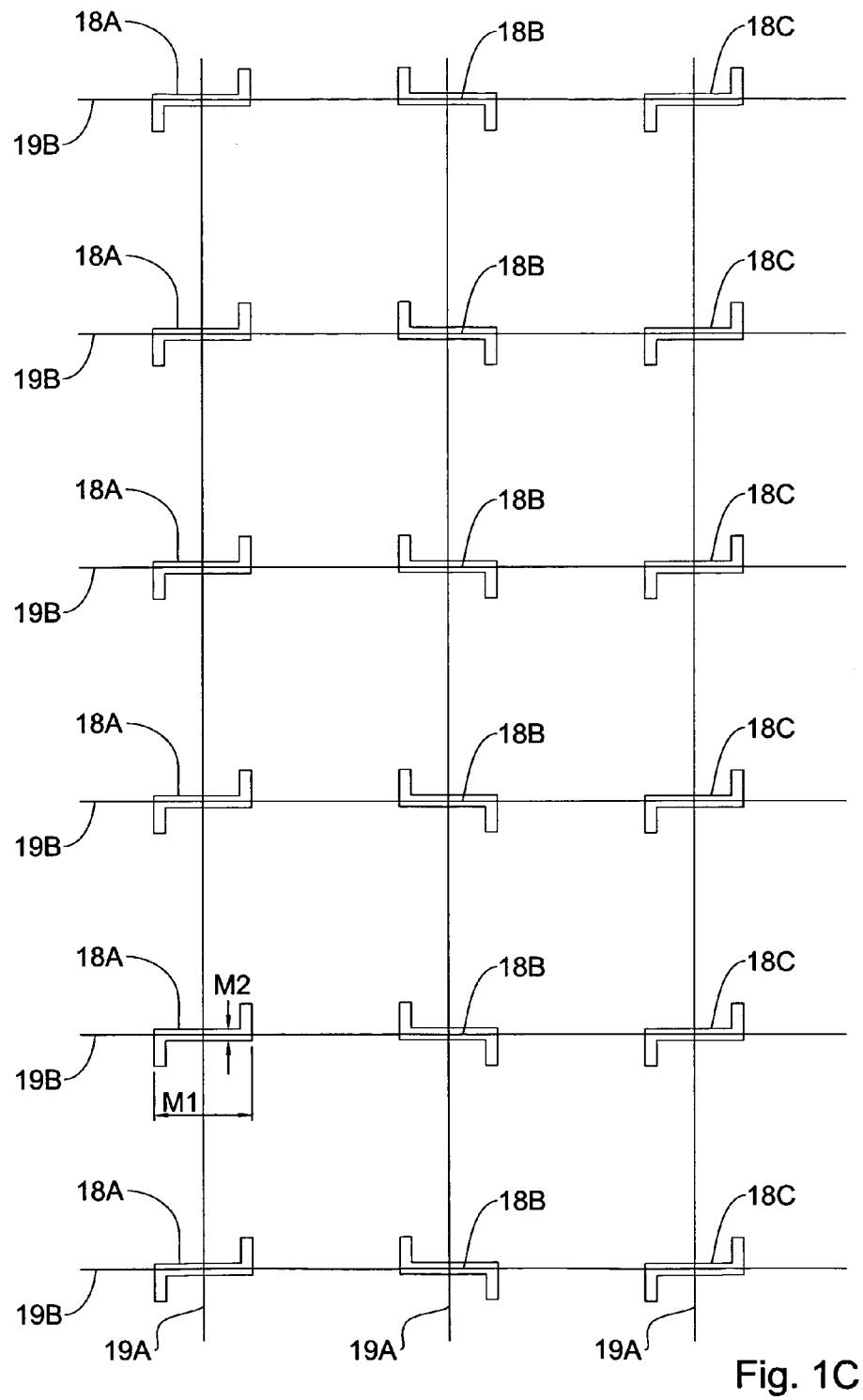
FIG. 1C is a schematic top view of the columns of the support system in FIGS. 1A and 1B, showing a horizontal cross-section of the columns.

Referring now to FIGS. 1A to 1C, the support system 10, will now be described in more detail.

The support system 10 comprises horizontal beams 16 configured to suspend the evaporation elements 206 (FIG. 1) and the pipes 210 (FIG. 1), inter-connected vertical columns (18A, 18B, 18C) configured to hold the beams 16 in a suspended position, and support members (20, 22, 24, 26, 28). Each of the beams, columns and support elements are completely connected by mechanical fasteners 33.

As seen best in FIG. 1C, the columns are located at an intersection of a first imaginary horizontal lines 19A and second imaginary horizontal line 19B. The imaginary lines (19A,19B) are perpendicular to each other The support system 10 comprises first, second and third parallel rows (A, B, C) each of which comprising a first plurality of parallel of columns (18A, 18B, 18C). For ease of understanding, each column in the first row A is identified as '18A', each column in the second row B is identified as '18B', and each column in the third row C is identified as '18C'. In the present example there are six columns in each of the three rows (A, B, C).

As can be seen best in FIG. 1C, each column (18A, 18B, 18C) has at least one section extending along at least a majority of the column's vertical dimension, at which, in the horizontal cross-section thereof, the largest dimension M1 is perpendicular to the first imaginary horizontal line 19A along which the first plurality of parallel columns (18A, 18B, 18C) is arranged. In this example the at least one section of columns is a web 40A.

Each column (18A, 18B, 18C) has opposite first and second ends (30, 32), and an intermediate portion 34 extending therebetween and parallel with a longitudinal axis L of the column (18A, 18B, 18C).

Figure 2A:
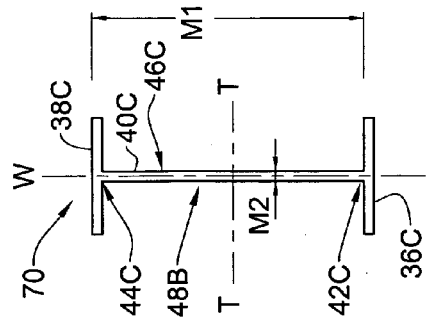
FIG. 2A is a schematic side view of an example beam or column.

Referring now to FIG. 2A, the shape of each column's (18A, 18B, 18C) cross section is shown. Each column comprises first and second flanges (36A, 38A) and a web 40A extending therebetween. The flanges (36A, 38A) and web 40A in the present example are arranged to form a Z profile cross section (also known as an S profile cross section).

The web 40A has opposite first and second extremities (42A, 44A) and first and second peripheral edges (46A, 48A) extending therebetween. The web 40A has an imaginary width axis W passing through the first and second extremities and being perpendicular to the longitudinal axis L of the column. In FIGS. 1A and 1B, the orientation of the longitudinal axis L is vertical, however it will be understood that the longitudinal axis can have a different orientation. The web 40A has an imaginary thickness axis T passing through the first and second peripheral edges (46A, 48A) and being perpendicular to the longitudinal axis L of the column (18A, 18B, 18C). The thickness axis T is perpendicular to the width axis W of the column (18A, 18B, 18C). A magnitude M1 of width W of the web is defined between the first and second extremities (42A, 44A) along the width axis. A magnitude M2 of thickness T of the web is defined between the first and second peripheral edges (46A, 48A) along the thickness axis T. The width M1 has a magnitude eight times greater than the magnitude of thickness M2. The flanges (36A, 38A) are disposed on the column such that an asymmetric cross sectional shape is formed about the width axis of the web.

Figure 2B:
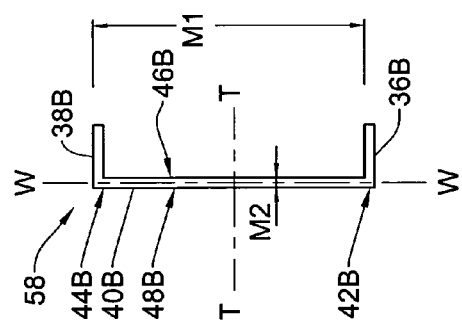
FIG. 2B is another schematic side view of an example beam or column.
Figure 2C:
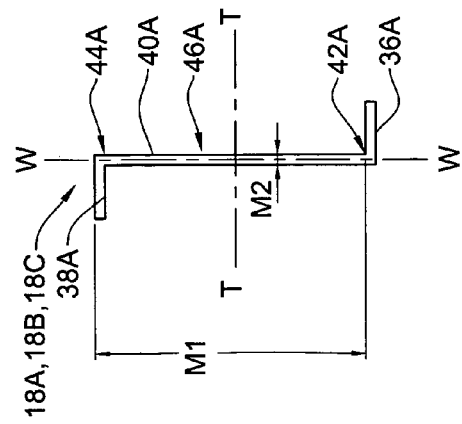
FIG. 2C is yet a further schematic side view of an example beam or column.

It will be understood that the flanges and web of each column can be alternately disposed to form a C profile cross section, as shown by the cross section designated 68 in FIG. 2B (with reference characters being similar to that of FIG. 2A except with the suffix B replacing the suffix A), or an I profile cross section, as shown by the cross section designated 70 in FIG. 2C (with reference characters being similar to that of FIG. 2A except with the suffix B replacing the suffix C).

The columns each have a solid shape.

The support system 10 further comprises a mounting member 50 fixed to the first end of each column and configured for fixed connection to a surface (not shown) or other element upon (not shown) which the support system 10 rests.

For ease of reference, an arrow designated by the numeral 52 shows a direction parallel with each row of columns, and an arrow designated by the numeral 54 shows a direction perpendicular with each row of columns.

As shown, each column (18A, 18B, 18C) is oriented with:
the intermediate 34 portion thereof substantially vertically;
the width axis W thereof perpendicular to each of the parallel rows of columns (A, B, C); and
the thickness axis T thereof parallel to each row of the parallel rows of columns.

From a plan view of the support system 10, it is shown that the columns (18A, 18C) of the first and third rows have a cross section appears in the form of a 'Z', and that the columns 18B of the second row has the column oriented such that it appears in the form of an 'S'. While column 18B still has a Z cross section, it appears from a plan view to have an S cross section as it is rotated 180 degrees with respect to columns (18A, 18C). Such orientation of the columns can allow ease of assemble of the slanted support members 28.

Reverting to FIGS. 1A and 1B, it can be seen that adjacent columns in the same row (A, B, C) are interconnected via a lower and upper horizontal support member (20, 22) and a slanted support member 24, each of which having opposite first and second ends (56,58), and an intermediate portion 60 extending therebetween.

The lower horizontal support members 20 have, in this example, a U-shaped cross section. The flanges of each of the peripheral support members 20 being disposed between a web thereof and the support member 20 along the middle row B of the structure, to thereby receive the support members 26 therein. The lower horizontal support members 20 are formed with apertures 21.

It will be appreciated that the lower horizontal support members 20 can be have different cross sections, such as a Z shaped cross section.

The upper horizontal support members 22 have, in this example, the same profile as the columns (18A, 18B, 18C) described above. However, it will be understood that the upper horizontal support members 22 can have any of the cross sections shown in FIGS. 2A to 2C, or any other appropriate cross section. The upper horizontal support members have a solid shape.

As shown, each upper horizontal support member 22 is oriented with:
the intermediate portion 34 thereof substantially horizontal;
the width axis W thereof substantially vertical; and
the thickness axis T thereof perpendicular to the direction of each row of the parallel rows of columns (A, B, C).

The slanted support 24 members have an L-shaped cross section. The slanted support members 24 extend from a lower end 30 of one column to an upper end 32 of an adjacent column.

Adjacent columns in different rows (A, B, C) are interconnected via bottom support members 26 and beams 16. The end columns of each row are additionally connected to the adjacent column in the adjacent row by a slanted support member 28. Each of the bottom support members, beams and slanted support members have opposite first and second ends, and an intermediate portion extending therebetween.

The beams 16 have, in this example, the same profile as the columns 18 and horizontal support members 22 described above. However, it will be understood that the beams 16 can have any of the cross sections shown in FIGS. 2A to 2C, or any other appropriate cross section. The beams are disposed a distance X apart from each other. In this example the distance X is about 40 cm. The beams 16 are formed with apertures 62 along the intermediate portions thereof, the purpose of which will be explained below. The beams 16 each have a solid shape.

The bottom support members 26 have a solid cylindrical shape. The slanted support 28 members have an L-shaped cross section. The slanted support members 28 extend from a lower end of one column to an upper end of the adjacent column 18. The bottom support members 26 are disposed a distance Y apart from each other. In the present example distance Y is about 0.8 m.

Notably distance X is of far smaller magnitude than distance Y, and hence there are many more beams than bottom support members. This is due to the fact that the beams 16 are needed to support the significant weight of the pipes (not shown) and evaporation elements (not shown).

As shown, each beam 16 is oriented with:
the intermediate portion 34 thereof substantially horizontal;
the width axis W thereof substantially vertical; and
the thickness axis T thereof parallel to the direction of each row of the parallel rows of columns.

The beams 16 or columns 18 can be made of any suitable rigid material, for example metal or fiberglass.

Two adjacent columns 18 of the first and second rows (A, B), together with the beam 16 supported thereon, and evaporation element (FIG. 1) supported thereon can be considered an evaporation assembly module.

Figure 3C:
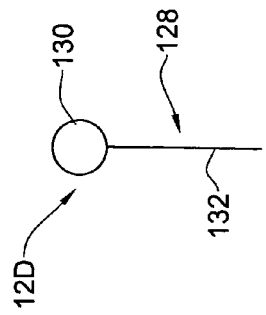
FIG. 3C is a schematic side view of an evaporation element according to another example.
Figure 3D:
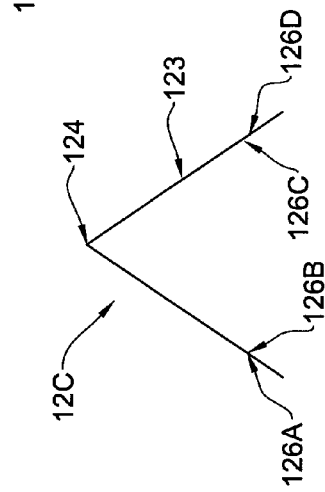
FIG. 3D is a schematic side view of an evaporation element according to yet another example.
Figure 3E:
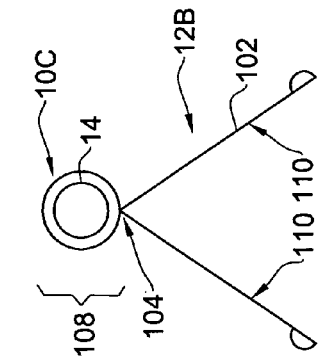
FIG. 3E is a schematic side view of an evaporation element according to still another example.
Figure 3B:
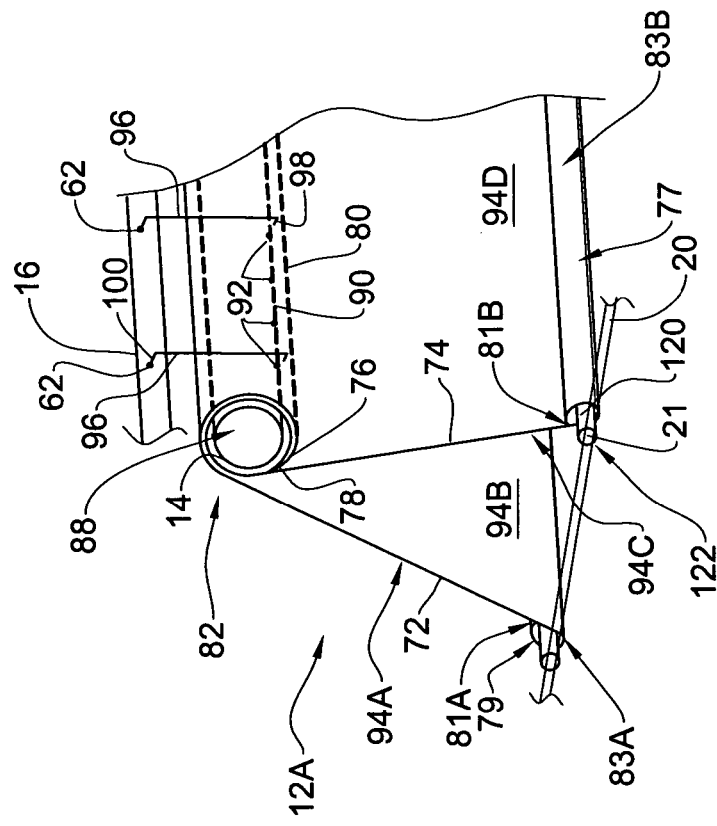
FIG. 3B is a partial schematic perspective view of the elements in FIG. 3A, with a portion of the pipe being partially shown in dashed lines, and further comprising support members and brace elements connected thereto.
Figure 3A:
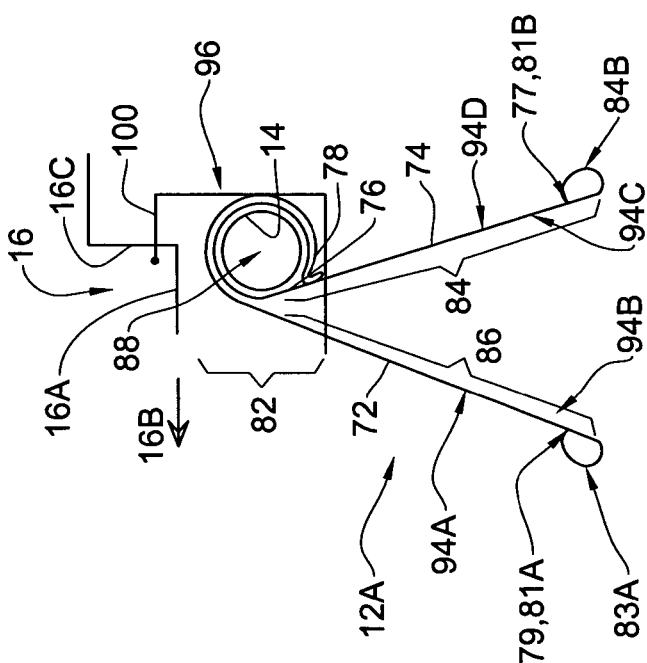
FIG. 3A is a schematic side view of an evaporation element connected at one end to a pipe suspended by a beam via connection elements.
Figure 4B:
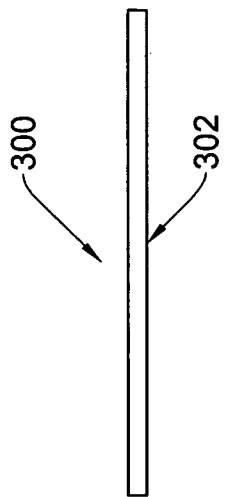
FIG. 4B is a schematic side view of the planar material in FIG. 4A.
Figure 4D:
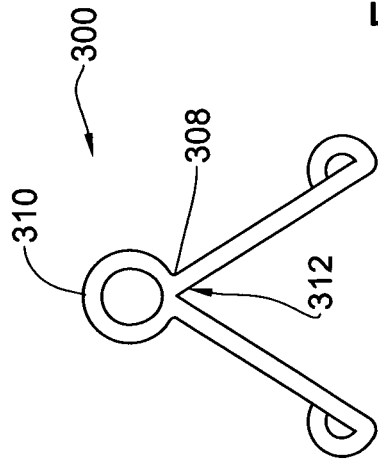
FIG. 4D is a schematic side view of the planar material in FIGS. 4A to 4C joined at different locations therealong.
Figure 4A:
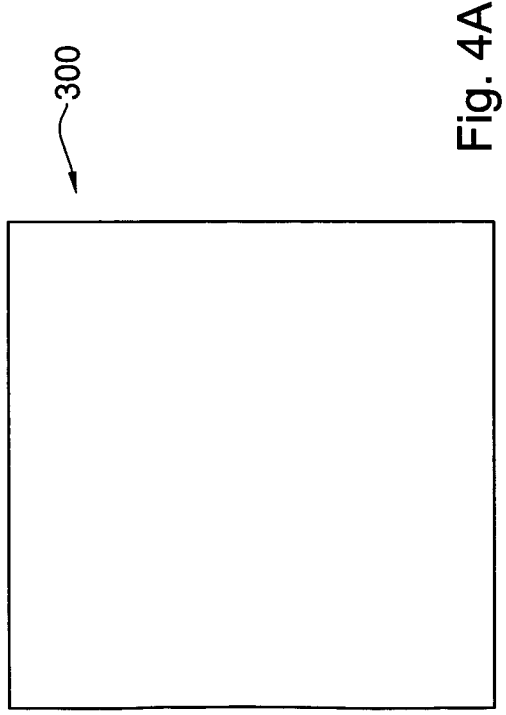
FIG. 4A is a schematic front view of a planar material that can be used to make an evaporation element.
Figure 4C:
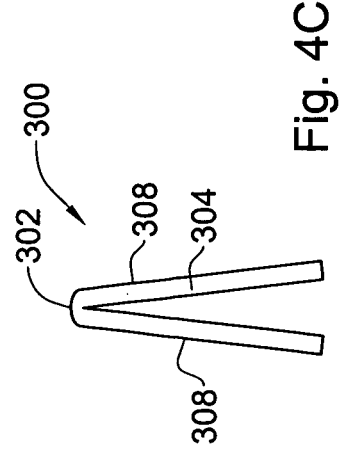
FIG. 4C is a schematic side view of the planar material in FIGS. 4A and 4B folded.

The evaporation assembly 200 comprises a plurality of evaporation elements 206 and pipes which are similar to those shown in FIGS. 3A and 3B.

Referring now to FIGS. 3A and 3B, an example evaporation element 12, wetting pipe 14 configured for wetting the evaporation elements 12, and a beam 16, configured to suspend the evaporation element 12 and wetting pipe 14, via columns of the type described in FIGS. 1A-1C will now be described.

The evaporation element, generally designated as 12A, comprises first and second sheets of fabric (72, 74) made of a hydrophilic material. The example but usually not hydrophilic material used here is an 85% shade net produced and sold under the trade name TamaShade™ by Tama Plastic Industry, Kibbutz Mishmar Ha'Emek, Israel.

Each of the first and second sheets (72, 74) are joined at an upper edge thereof (76, 78) along a merging line 80 (shown in dashed lines in FIG. 3B) to form a sleeve portion 82 and two members (84, 86) extending from the merging line 80.

Each of the first and second sheets (72, 74) have a lower edge thereof (77, 79) folded and joined to another portion of the same sheet along a merging line 81A, 81B to form a tubular portion (83A, 83B).

Referring to FIG. 3B, it can be seen that each tubular portion (83A, 83B) has a rigid elongated brace member 120 slotted therethrough and held thereby. Each brace member 120 is fastened at one end 122 thereof to an aperture 21 of the support member 20 via a connection member (not shown). Such construction holds the first and second sheets (72, 74) in a static arrangement.

Notably, each evaporation member (84, 86) is free of connection to another such evaporation member at least at the lowermost ends thereof (which in this case are constituted by the tubular portions 83A, 83B)

The sleeve portion 82 encompasses a wetting pipe 14, which is slotted therethrough and configured for wetting the evaporation element 12A.

The pipe 14 comprises first and second ends (the first end not shown; 88) and an intermediate portion 90 extending therebetween. The first end of the pipe 14 can be open and connected to a feed pipe (not shown) configured to provide liquid (not shown) to be evaporated thereto, and the second end 88 of the pipe 14 can be sealed to prevent liquid exiting therethrough. The intermediate portion 90 is formed with at least one fluid outlet, which in this case is a plurality of perforations 92 or apertures therealong to allow liquid communication of the pipe with the evaporation element 12A.

Both the first and second sheets (72, 74) of the sleeve portion 82 of the evaporation element 12A encompass the perforated intermediate section 90 of the pipe 14.

Referring to FIGS. 5A to 5E, various configurations of the fluid outlets of the wetting pipes are shown.

Figure 5A:
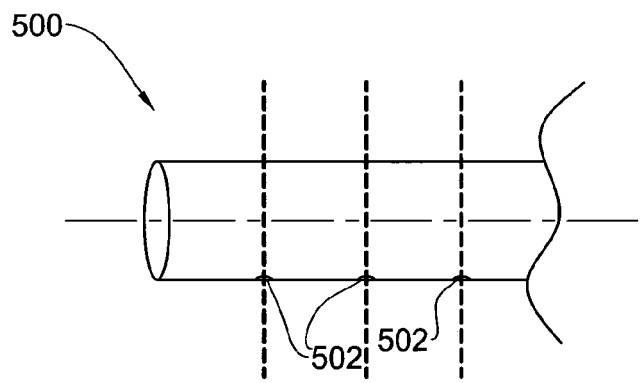
FIG. 5A is a schematic side view of a portion of a wetting pipe.

In FIG. 5A there is shown a wetting pipe 500, comprising plurality of apertures 502 formed therein. Each aperture is spaced from an adjacent aperture along an imaginary longitudinal axis passing through the wetting pipe 500.

Figure 5B:
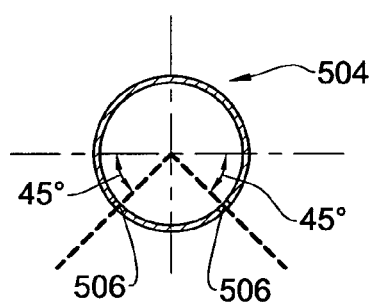
FIG. 5B is a schematic front sectional view of a portion of another wetting pipe.

In FIG. 5B there is shown a wetting pipe 504, comprising two of apertures 506 formed in a cross-section thereof. The apertures 506 each are spaced from each other along a plane perpendicular to an imaginary longitudinal axis passing through the wetting pipe. In this case the apertures are disposed about 45 degrees below a horizontal plane.

Figure 5C:
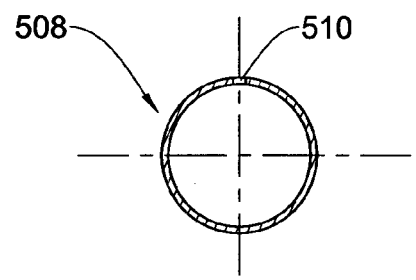
FIG. 5C is a schematic front sectional view of a portion of yet another wetting pipe.

In FIG. 5C there is shown a wetting pipe 508, comprising an upwardly facing aperture 510.

Figure 5D:
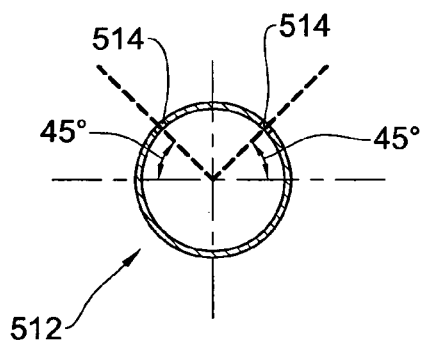
FIG. 5D is a schematic front sectional view of a portion of still a further wetting pipe.

In FIG. 5D there is shown a wetting pipe 512, comprising apertures 514 facing about 45 degrees above a horizontal plane.

Figure 5E:
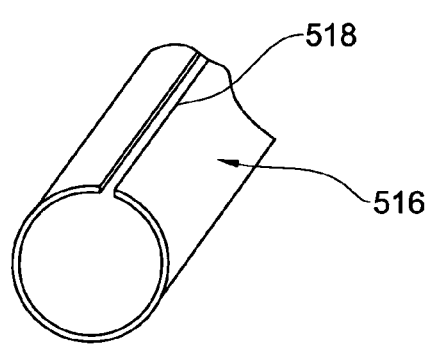
FIG. 5E is a schematic perspective view of a portion of a wetting pipe.

In FIG. 5E there is shown a wetting pipe 516, comprising a longitudinal slit 518 formed in the wetting pipe.

Each member (84, 86) comprises two evaporation surfaces (94A, 94B, 94C, 94D).

Referring to FIGS. 4A to 4D, it will be understood that an evaporation element can be formed by
folding a planar shaped material 300 along a folding line 302 to form two evaporation members (304,306) extending therefrom; and
joining the two evaporation members along a merging line 308 spaced from the folding line and parallel thereto, to thereby form a sleeve portion 310.

As can be seen there is an apex 312 associated with the evaporation members.

There are further shown hanging elements 96 in the form of hooks which are engaged at a first end 98 to the evaporation element 12A and at a second end 100 to the apertures 62 formed in the beams 16.

Figure 7:
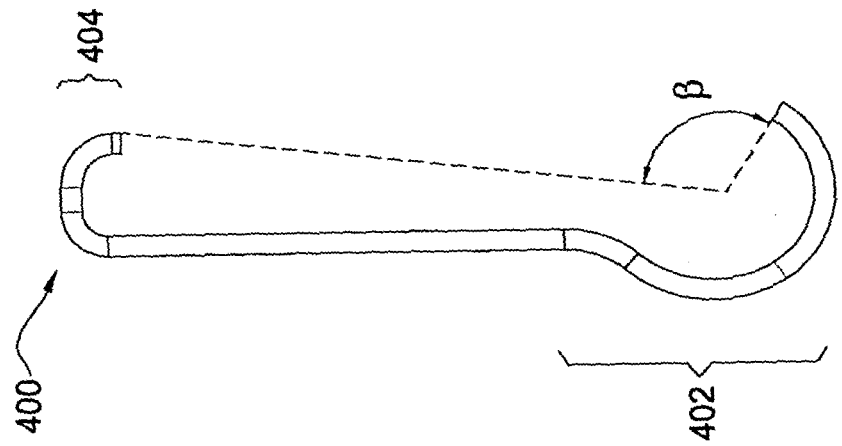
FIG. 7 is a schematic side view of a hanging element.

Referring to FIG. 7, a further example of a hanging element, generally designated as 400 is shown. The hanging element 400 comprises a first end 402 and a second end 404, the first end 402 being configured for simultaneously holding at least a portion of an evaporation element (not shown) and at least a portion of a wetting pipe (not shown), and the second end 404 of the hanging element 400 being configured for attachment to a beam (not shown).

The hanging element can be configured to surround a radial edge of the at least portion of the pipe by an angle of at least 240 degrees (β).

Reverting to FIG. 3A, an example is shown that the beam 16 has a lowermost flange 16A which extends in a first direction 16B away from the web 16C thereof, and the upper second end 100 of the hanging element 96 extends in a direction away from the first direction, so that both the flange 16A and second end 100 jointly shield against undesired upwardly directed spray drops from a pipe held by the hanging element.

The support system 10 further comprises a liquid distribution system (not shown), including one or more feed pipes and a pump configured to provide liquid to the one or more feed pipes. The one or more feed pipes having an inlet in liquid communication with a pond (not shown) and an outlet or outlets in liquid communication with a plurality of perforated pipes of the type described above. In operation the pump provides liquid to be evaporated from the pond to the pipes 14 via the one or more feed pipes. Thereafter the pipes wet the evaporation elements 12A which are at least partially exposed to wind, so as to allow evaporation of the liquid the evaporation surfaces.

Referring to FIG. 3C, another example evaporation element, generally designated as 12B, is shown.

The evaporation element 12B is similar to the evaporation element 12A described in connection with FIGS. 3A and 3*b*, except that it only comprises a single sheet 102. The sheet 102 is joined to itself along a merging line 104. The areas of the sheet 102 joined are proximate to a center line 106 of the sheet 102 and the sheet 102 thus forms a sleeve portion 108 and two members (110, 112) extending from the merging line.

Referring to FIG. 3D, another example evaporation element, generally designated as 12C, is shown.

The evaporation element 12C is similar to the evaporation element 12B in that it comprises a single sheet 123, except that it does not comprise a sleeve portion but only comprises a ridge portion 124. Thus the apex for such evaporation element is constituted by the ridge portion.

While both evaporation elements 12A and 12B have ridge portions (constituted in these cases by the sleeve portions thereof) together with sleeve portions, it will be understood that the evaporation element can function even without such sleeve portion, albeit without any potential benefit thereof, and can similarly be suspended via a suitable connection means to a beam such as via a hook.

It will be appreciated that this arrangement also allows the potential benefit of an evaporation element with four evaporation surfaces (126A, 126B, 126C, 126D).

It will also be appreciated that the evaporation element 12C could also be made with two sheets extending from the ridge portion.

It should be mentioned that FIGS. 3C and 3D show the members, in a side view, forming an upside down V-shape. Since the apex of an evaporation member in accordance with the subject matter of the application can be of any shape, for example it could be flat, the members can form other shapes, such as an upside down U-shape.

It will be understood that FIGS. 3C and 3D are schematic, and that the angle formed between two members of an evaporation member in accordance with the subject matter of the application can differ significantly to that shown. For example the angle formed between the two members can be extremely small, such that the members are almost vertical.

Referring to FIG. 3E, another example evaporation element, generally designated as 12D, is shown.

The evaporation element 12D is similar to the evaporation element 12B in that it comprises a single sheet 128 from which is formed a sleeve portion 130, but only comprises a single member 132 extending from the sleeve portion 124.

Thus this arrangement can allow a potential benefit of the sleeve portion, without the potential benefit of more than two evaporation surfaces.

It will be appreciated that the evaporation element 12D, can be formed with a tubular portion and can be held in a particular arrangement with the use of a brace element, if desired.

Regardless of which type of evaporation element is used, each of the components of the evaporation assembly, i.e. the columns, beams, support members, pipes, and evaporation elements, can be pre-manufactured for swift assembly at a desired site.

The evaporation assembly module or evaporation assembly can be assembled as follows:

- pre-manufacturing components of the evaporation assembly module, for example the columns, beams, pipes and evaporation elements;
- leveling a site where columns are to be erected;
- erecting a pair of parallel columns and suspending a beam thereon;
- preparing saddle connections for a feed pipe to be fitted thereto;
- connecting the wetting pipe to a corresponding evaporation element (via the apex of the evaporation element if one exists);
- suspending the wetting pipe and the connected evaporation element to the support structure, in a suspended position (the suspending can be carried out by initially connecting a first portion of the evaporation element to the support structure at a first height, and subsequently connecting a second portion of the evaporation element distal to the first portion at a second height which is lower than the first height);
- securing each end of an evaporation member of the evaporation element which is distal to an apex, sleeve or ridge thereof (where such exists), to a fixed point spaced from another portion of any evaporation element.

The securing of each end can be carried out by connecting pipes and brace elements to corresponding evaporation elements (this step can be carried out before or contemporaneously with any of the previous steps); and In cases where there is a support system comprising a plurality of evaporation assembly modules, there can be a further step of suspending at least one additional evaporation element to the support system.

Where a hanging element is used the method can include connecting the at least one evaporation element and the at least one pipe to the hanging element; and connecting the hanging element to the beam, thereby at least partly suspending both the at least one pipe and the at least one evaporation element simultaneously to the beam in a suspended position.

The invention claimed is:

1. A method of assembling an evaporation assembly module, the evaporation assembly module including an evaporation element, a pipe having at least one fluid outlet and being configured for wetting at least a portion of the evaporation element by fluid passing through the at least one fluid outlet, and a support structure configured for holding the evaporation element in a suspended position, the method comprising:

a) constructing a support system including the support structure, the support system including inter-connected generally vertical columns arranged so that each of the inter-connected generally vertical columns is located at an intersection of first and second imaginary horizontal lines that are substantially perpendicular to each other and along which corresponding first and second pluralities of substantially parallel columns are arranged, the first plurality of substantially parallel columns having a greater number of columns than the second plurality of substantially parallel columns; each of the inter-connected generally vertical columns having at least one section extending along at least a majority of the column's vertical dimension, at which, in the horizontal cross-section thereof, the largest dimension is substantially perpendicular to the first imaginary horizontal line along;

b) subsequent to step (a), connecting the pipe to the evaporation element so as to ensure that fluid passing through at least the fluid outlet of the pipe wets at least a portion of the evaporation element; and c) subsequent to step (b), suspending the pipe and the connected evaporation element to the support structure, in a suspended position.

2. The method of claim 1, wherein the evaporation element comprises an apex and at least two evaporation members, each of the at least two evaporation members having a first end, a second end, and an evaporation surface, and wherein the step of connecting comprises connecting the pipe to the apex of the evaporation element.

3. The method of claim 1, further comprising initially connecting a first portion of the evaporation element to the support structure at a first height, and subsequently connecting a second portion of the evaporation element distal to the first portion at a second height that is lower than the first height.

4. The method of claim 3, wherein the first portion of the evaporation element is an apex, sleeve, or ridge thereof, and wherein the second portion is a lowermost end of an evaporation member thereof.

5. The method of claim 3, wherein the second portion is connected to a fixed point spaced from another portion of any evaporation element.

6. The method of claim 1, wherein the step of suspending comprises bringing the evaporation element to a form of an upside down V-shape or U-shape, when viewed in a side view of the evaporation element.

7. The method of claim 1, wherein the support structure is part of a support system comprising a plurality of evaporation assembly modules, and subsequent to the step of suspending, there is a further step of suspending at least one additional evaporation element from the support system.

8. The method of claim 1, wherein the evaporation element is a single evaporation element having an apex and comprising at least two evaporation members, each of the at least two evaporation members having a first end and a second end, the first ends of all of the at least two evaporations members being associated with the apex, the method further comprising:
connecting the apex to a position at a height above all of the second ends; and
suspending the second ends in a position free of connection to another such evaporation member.

9. The method of claim 1, wherein the evaporation element comprises a sleeve portion, and wherein connecting the evaporation element to the pipe comprises slotting the pipe through the sleeve portion.

10. The method of claim 1, wherein the evaporation element comprises a sleeve portion, and further comprising, before step (b), producing the sleeve portion by:
folding a planar shaped material along a folding line to form two evaporation members extending therefrom; and
joining the two evaporation members along a merging line spaced from the folding line and substantially parallel thereto, thereby forming the sleeve portion.

11. The method of claim 1, further comprising assembling the support structure by connecting a plurality of beams and a plurality of columns, a majority of the connecting being carried out via the use of mechanical fastening elements.

12. The method of claim 1, further comprising suspending a plurality of generally horizontal beams held in a suspended position via the inter-connected generally vertical columns, each of the plurality of generally horizontal beams having at least one section extending along at least a majority of the beam's horizontal dimension, at which, in the vertical cross-section thereof, the largest dimension is vertical.

13. The method of claim 1, wherein the support structure is configured for holding at least two evaporation elements, each of the at least two evaporation elements having an evaporation surface with uppermost and lowermost edges, and two side edges extending between the uppermost and lowermost edges, the support structure being configured to hold the at least two evaporation elements so that one of the two side edges of one of the evaporation surfaces of one of the at least two evaporation elements is adjacent to one of the side edges of one of the evaporation surfaces of the other one of the at least two evaporation elements, and the uppermost and the lowermost edges of the evaporation surfaces of the at least two evaporation elements are generally coplanar.

14. The method of claim 1, further comprising:
constructing a support system including the support structure; and
mounting a liquid distribution system to the support system in a suspended position, the liquid distribution system including a plurality of substantially parallel wetting pipes configured to wet evaporation members disposed underneath the pipes, each of the plurality of substantially parallel wetting pipes having two ends, a feed pipe having two opposite manifold sections between that the plurality of substantially parallel wetting pipes extend and to which the ends of the plurality of substantially parallel wetting pipes are connected in fluid communication, each of the two opposite manifold section having two ends between which all connections thereof to the plurality of substantially parallel pipes are located, and two opposite bridging sections extending between corresponding ends of the two opposite manifold sections, a fluid inlet configured to be in fluid communication with an external fluid source and located in one of the bridging sections of the feed pipe; and wherein the plurality of substantially parallel wetting pipes have associated fluid outlets for wetting the evaporation element therethrough, and being in fluid communication with the manifold sections.

15. The method of claim 1, wherein the evaporation assembly module comprises a hanging element configured to at least partly hold the evaporation element and the pipe in a suspended position from a beam of the support structure, wherein step (b) comprises connecting the evaporation element and the pipe to the hanging element; and wherein step (c) comprises connecting the hanging element to the beam to thereby at least partly suspend both the pipe and the evaporation element simultaneously from the beam in a suspended position.

16. A liquid distribution system, comprising:
a support system including inter-connected generally vertical columns arranged so that each of the inter-connected vertical columns is located at an intersection of first and second imaginary horizontal lines which are substantially perpendicular to each other and along which corresponding first and second plurality of substantially parallel columns are arranged, the first plurality of substantially parallel columns having a greater number of columns that the second plurality of substantially parallel columns; each of the inter-connected generally vertical columns having at least one section extending along at least a majority of the column's vertical dimension, at which, in the horizontal cross-section thereof, the largest dimension is substantially perpendicular to the first imaginary horizontal line along;
at least one evaporation assembly including:
an evaporation element; and a pipe having at least one fluid outlet and configured for wetting at least a portion of the evaporation element by fluid passing through the fluid outlet; and wherein the support system holds the evaporation element and the pipe connected to each other in a suspended position so as to ensure that fluid passing through at least said outlet of the pipe wets at least a portion of the evaporation element.

17. The liquid distribution system of claim 16, further comprising:

a feed pipe having two opposite manifold sections between which the plurality of substantially parallel pipes extend and to which the ends of the plurality of substantially parallel pipes are connected in fluid communication, each of the two opposite manifold sections having two ends between which all connections thereof to the plurality of substantially parallel pipes are located, and two opposite bridging sections extending between corresponding ends of the two opposite manifold sections;

a fluid inlet configured to be in fluid communication with an external fluid source and located in one of the bridging sections of the feed pipe; and wherein:

the at least one evaporation assembly includes a plurality of evaporation assemblies including a plurality of evaporation elements that include a plurality of substantially parallel wetting pipes;

the plurality of substantially parallel wetting pipes are configured to wet the plurality of evaporation elements disposed underneath the plurality of substantially parallel pipes, each of the plurality of substantially parallel wetting pipes having two ends;

wherein the plurality of substantially parallel wetting pipes have associated fluid outlets for wetting an evaporation element therethrough, and being in fluid communication with the two opposite manifold sections.

* * * * *